US008579042B2

United States Patent
Hanawa et al.

(10) Patent No.: US 8,579,042 B2
(45) Date of Patent: Nov. 12, 2013

(54) BATTERY PACK AND CORDLESS TOOL USING THE SAME

(71) Applicant: Hitachi Koki Co., Ltd., Tokyo (JP)

(72) Inventors: Hiroyuki Hanawa, Ibaraki (JP); Kiyoshi Kato, Ibaraki (JP); Kazuhiko Funabashi, Ibaraki (JP); Katsuhiro Oomori, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 13/770,727

(22) Filed: Feb. 19, 2013

(65) Prior Publication Data
US 2013/0154549 A1 Jun. 20, 2013

Related U.S. Application Data

(63) Continuation of application No. 12/280,948, filed as application No. PCT/JP2007/054360 on Feb. 28, 2007, now Pat. No. 8,381,829.

(30) Foreign Application Priority Data

Feb. 28, 2006 (JP) ................................. 2006-051489

(51) Int. Cl.
*E21B 1/14* (2006.01)
(52) U.S. Cl.
USPC .................................. 173/2; 173/217; 429/61
(58) Field of Classification Search
USPC ......... 173/2, 217; 318/139; 310/50; 320/116; 429/61, 90, 122
See application file for complete search history.

(56) References Cited

U.S. PATENT DOCUMENTS

| 5,619,116 A | 4/1997 | Takano et al. |
| 5,853,915 A | 12/1998 | Suto |
| 5,963,019 A * | 10/1999 | Cheon ........................... 320/150 |
| 6,027,828 A | 2/2000 | Hahn |
| 6,388,426 B1 | 5/2002 | Yokoo et al. |
| 6,692,864 B1 | 2/2004 | Dansui et al. |

(Continued)

FOREIGN PATENT DOCUMENTS

| JP | 56-021363 U | 2/1981 |
| JP | 63-10460 A | 11/1994 |

(Continued)

OTHER PUBLICATIONS

Japanese Notification of Reasons for Refusal, w/ English translation thereof, issued in Japanese Patent Application No. JP 2006-051489 dated Oct. 11, 2012.

(Continued)

*Primary Examiner* — Alexandra Elve
*Assistant Examiner* — Nathaniel Chukwurah
(74) *Attorney, Agent, or Firm* — McDermott Will & Emery LLP

(57) ABSTRACT

A battery device is constituted by connecting such cell assemblies in parallel as each includes: a first cell group having a plurality of cells connected in series; a housing container for housing the first cell group; current detector housed in the container for detecting a current to flow through the first cell group; a switching element connected with the first cell group for turning ON/OFF the current to flow through the first cell group; and a controller for controlling the ON/OFF of the switching element in response to the output signal of the current detector.

13 Claims, 10 Drawing Sheets

(56) References Cited

U.S. PATENT DOCUMENTS

| | | |
|---|---|---|
| 6,751,109 B2 | 6/2004 | Doss et al. |
| 7,056,619 B2 | 6/2006 | Heine et al. |
| 8,381,829 B2 * | 2/2013 | Hanawa et al. .................. 173/2 |
| 2003/0096158 A1 | 5/2003 | Takano et al. |
| 2004/0113585 A1 | 6/2004 | Stanesti et al. |
| 2005/0073282 A1 | 4/2005 | Carrier et al. |
| 2005/0077878 A1 | 4/2005 | Carrier et al. |
| 2005/0110458 A1 | 5/2005 | Seman et al. |
| 2005/0134228 A1 | 6/2005 | Elder |
| 2005/0280393 A1 | 12/2005 | Feldmann |
| 2009/0146614 A1 | 6/2009 | Carrier et al. |
| 2009/0237012 A1 | 9/2009 | Yokoyama et al. |

FOREIGN PATENT DOCUMENTS

| | | |
|---|---|---|
| JP | 2001-076696 A | 3/2001 |
| JP | 2001-095158 A | 4/2001 |
| JP | 2001-179661 A | 7/2001 |
| JP | 2001-229891 A | 8/2001 |
| JP | 2003-164066 A | 6/2003 |
| JP | 2007-508681 A | 4/2007 |
| JP | 2007-229827 A | 9/2007 |
| WO | WO-2005-038952 A2 | 4/2005 |

OTHER PUBLICATIONS

Japanese Office Action, and English translation thereof, issued in Japanese Patent Application No. 2006-051489 dated Mar. 5, 2012.
Office Action dated May 24, 2010 in U.S. Appl. No. 12/280,948.
Office Action dated Nov. 5, 2010 in U.S. Appl. No. 12/280,948.
Office Action dated Oct. 29, 2012 in U.S. Appl. No. 12/280,948.

\* cited by examiner

BATTERY PACK AND CORDLESS TOOL USING THE SAME

This application is a continuation of U.S. application Ser. No. 12/280,948 filed Aug. 27, 2008, which is a National Stage entry of PCT/JP2007/054360 filed Feb. 28, 2007 which claims priority to Japanese Patent Application No. 2006-051489 filed Feb. 28, 2006, the entire contents of each of which is hereby incorporated by reference.

TECHNICAL FIELD

The present invention relates to a battery device employing a stackable cell assembly technology (as will be abbreviated into the "SCAT") and a cordless electric tool using the battery device.

BACKGROUND ART

First of all, the concept of the SCAT proposed by us is explained with reference to FIGS. 1A-1D.

The cordless electric tool such as an electric driver, an electric drill or an impact tool is constituted to include a motor for generating a rotating power by reducing the speed of the motor by a speed reducing mechanism and then transmitting the rotating power to a tip tool.

In FIG. 1A, numeral 20 designates a cordless electric tool, which is constituted to include a body trunk portion 20A and a handle portion 20B. A tool 30 is attached to the tip of the body trunk portion 20A. The handle portion 203 has its one end connected to the body trunk portion 20A and mounts a battery device 10 at its other end portion.

All these cordless electric tools are determined by the makers in the rated voltage (as will be abbreviated into "V") and the current capacity (or the ampere time, as will be abbreviated into "Ah"). The rated voltage (V) is determined on the basis of both the magnitude of the rotating power to be transmitted to the tool and the voltage necessary for driving the motor for generating the rotating power. On the other hand, the current capacity (Ah) is determined by both the magnitude of the load current of the motor and the specifications of the time period, for which the tool can be continuously used. For example, the electric tool having the battery device of 3 Ah mounted thereon is characterized to feed an electric current of 3 A continuously for one hour to the motor.

These rated voltage and current capacity are determined individually for every tools by the makers so that their values cannot be arbitrarily changed or modified by the users.

On the contrary, the SCAT proposes an electric tool of such a new concept that the current capacity (Ah) can be arbitrarily selected by the user although the rated voltage (V) of the electric tool is determined by the maker.

This new concept is desired in that one cordless electric tool can satisfy the various needs of the user. When the electric tool is used in a narrow place such as the ceiling space, for example, the user will desire the electric tool as light as possible better than the electric tool having a large current capacity. However, a half or so of the weight of the existing cordless electric tool is occupied by a battery pack or a battery device, and only the battery pack fitting the rated voltage and the current capacity of the electric tool can be mounted so that the weight of the electric tool cannot be changed for any operation.

In case it is desired to continue an operation for a long time, on the other hand, the desired electric tool can be used without its battery pack being frequently charged. However, the electric tool of the prior art is prefixed in the current capacity so that it cannot use battery packs of different current capacities for different operations.

The cordless electric tools of many kinds can naturally use tools of different situations for the different operations. However, the user will not desire to prepare many electric tools and to bring them to the working sites.

The SCAT can satisfy these various needs of the user. For example, the differences between the existing battery device and the battery device using the SCAT are described for the case, in which the electric tool has a rated voltage of 18 V and a current capacity of 3 Ah.

FIG. 1B shows the constitution of the battery device of the prior art of the case, in which a NiCd cell of a nominal voltage of 1.2 V is used as the battery cell. This battery device is constituted by connecting fifteen cells C1 to C15 in series and housing them in a battery pack container 10A.

In case the lithium cells are used as the battery cell, on the other hand, their nominal voltage is as high as 3.6 V, and the current capacity is so small as about 1.5 Ah. As shown in FIG. 1C, therefore, the battery device is constituted by connecting the series connection of the five cells C11 to C15 and the series connection of the five cells C21 to C25 in parallel and by housing the totally ten battery cells in the battery pack container 20A.

In the case of using the SCAT, on the contrary, the maker prepares the cell assembly, in which cells of the number needed for generating the rated voltage of the cordless electric tool are stored, as shown in FIG. 1D. In case the cell assembly is to be constituted by the lithium cells, for example, a cell assembly 100A is constituted by connecting five battery cells C11 to C15 having a nominal voltage of 3.6 V in series and by housing them in a container. Likewise, a cell assembly 100B is constituted by connecting the battery cells C21 to C25 in series and by housing them in the assembly container. These cell assemblies 100A, 100B, - - -, and 100N are so constituted that they may be connected, when stacked, in parallel.

The user can use one cell assembly as a battery device of 1.5 Ah, and can use two cell assemblies as a battery device of 3 Ah. In other words, the current capacity (Ah) of the cordless electric tool can be selectively determined by the user.

When the cell assembly is to be prepared by using the SCAT, it is desired to use the lithium cells having a high nominal voltage and a small current capacity. This is because the weight of the cell assembly can be reduced and because the current capacity can be finely selected by the user.

Here, the lithium cell indicates a vanadium-lithium cell, a manganese lithium cell or the like, which employs a lithium-aluminum alloy at its cathode and uses an organic electrolyte. On the other hand, the lithium ion cell generally employs cobaltous lithium in the anode and graphite in the cathode and uses an organic electrolyte as the electrolyte. Herein, for conveniences, the organic electrolyte secondary battery including the lithium cell and the lithium ion cell will be generally and merely called as the lithium cell.

As the prior art like the SCAT, there has already been proposed or developed the battery device, which is so constituted in the mobile electric device, e.g., a camera or a personal computer as ca connect a plurality of chargeable cells in parallel. For example, Patent Document 1 discloses a battery pack, which is used in a camera or the like and which can mount a desired number of auxiliary cells in addition to the main cell. In the case of the cordless electric tool, however, there exist technical problems of qualities different from those of the OA device or the mobile electronic device. Therefore, these problems have to be solved in case the battery device for the electric tool is developed by using the SCAT.

At first, one example of the cordless electric tool of the prior art is described with reference to FIG. 2A and FIG. 2B.

FIG. 2A shows the appearance of the cordless electric tool of the prior art, and FIG. 2B shows the electric circuit of the electric tool schematically. The electric tool 20 such as an electric driver, an electric drill or an electric wrench is constituted to include a body trunk portion 20A and a hand portion 20B connected to the body trunk portion 20A, and the battery device 10 is mounted on the end portion of the handle portion 20B.

In the housing of the body trunk portion 20A, there are housed a DC motor 210 for generating a rotating power, and a speed reducing mechanism portion 202 for reducing the rotating speed of the DC motor 201. A tip tool 30 such as a drill or a driver is attached to the tip of the speed reducing mechanism portion 202. In the case of the impact tool, an impact mechanism unit (although not shown) is interposed between the speed reducing mechanism portion 202 and the tip tool 30. Moreover, a trigger 203 is disposed near the connecting portion between body trunk portion 20A and the handle portion 20B.

As shown in FIG. 2B, a trigger switch 203A, the motor 201 and a switching element such as an FET are connected in series between the two terminals of the battery device 10. To the gate of the switching element 205, there is applied the pulse signal, which has its pulse width modulated by a control circuit 204. With this control circuit 204, there is connected a variable resistor 203B, which has its resistance varied in association with the operation of the trigger switch 203A. The pulse width of the output pulse of the control circuit 204 is varied by varying that resistance.

When the trigger 203 of FIG. 2A is pulled, the switch 203A of FIG. 2B is closed to apply the driving voltage is applied to the motor 201 by the battery device 10 only while the switching element 205 is ON, so that the motor 201 rotates. This rotating force is transmitted through the speed reducing mechanism 202 to the tip tool 30.

When the trigger 203 is pulled more deeply, the resistance of the variable resistor 203B varies. As a result, the pulse width of the pulses to be applied from the control circuit 204 to the gate of the switching element 205 is enlarged. As a result, the ON period of the switching element 205 is elongated to increase the average of the drive voltage to be applied to the motor 201. Thus, the rotating speed of the motor 201 can be controlled according to the pulling stroke of the trigger 203 thereby to control the magnitude of the rotating power to be transmitted to the tip tool 30. Moreover, the forward/backward rotating direction of the motor 201 can be switched by changing a switch 206 connected with the two ends of the motor 201.

[Patent Document 1] JP-A-2001-229891

DISCLOSURE OF INVENTION

According to our investigations, it has been found that the following technical problems arise when the battery device using the aforementioned SCAT is employed in the cordless electric tool thus far described.

(1) Countermeasures Against Overcurrent

The battery device 10 of the cordless electric tool 20 is used as a power source for feeding the drive voltage of the motor 201, and the motor 201 is used to generate the rotating power to be transmitted to the tool 30. The tip tool 30 is exemplified by a drill or a driver but is employed to work a workpiece so that the magnitude of a load to be applied to the tool 30 is so largely fluctuated as could not occur in a camera or a personal computer. If the fluctuations of the load on the tool 30 are serious, the fluctuations of the loading current through the motor 201 are naturally so dangerous that an overcurrent may also flow into the battery device 10.

Now, if the battery device 10 has a terminal voltage E, if the motor 201 has a counter electromotive force E and if the motor 201 has an armature resistance Ra, the current Ia to flow through the armature winding of the motor 201 is expressed by Ia=(V−E)/Ra. Therefore, the counter electromotive force E instantaneously approaches 0 so that the current Ia abruptly rises to several 10 A, when the tip tool 30 bits the workpiece so that the motor speed approaches 0.

In case cell assembles for generating voltages as high as 18 V or 24 V are connected in parallel, an overcurrent may dangerously flow if the charges of the cell assemblies are unbalanced. If a cell assembly having five battery cells fully charged and a cell assembly having five battery cells having a charge of 0% are connected in parallel, a current of several 10 A may flow through the closed circuit of the two cell assemblies.

In case, however, a lithium cell having a current capacity of 1.5 Ah is used as the battery cell, the battery cell may be damaged, if a current as high as about 30 A flows even for a short time period.

Likewise, in case the cell assembly having the fully charged battery cells and the cell assembly having the battery cells of a charge of 0% are connected in parallel and connected with the electric tool body, the load of the fluctuations of the load current of the motor may be applied to one cell assembly thereby to damage the cell assembly itself.

In the battery device of the electric tool thus using the SCAT, countermeasures have to be taken against the overcurrent, which may be produced for various causes. Especially in case the lithium cell is used, the countermeasures against the overcurrent are important because the current capacity (Ah) of the battery cell is smaller than that of the NiCd cell or the like.

(2) Selection of Assembly Suited for Characteristics of Electric Tool

The cordless electric tool is diversified into many kinds including an electric driver, an electric drill, an electric circular saw and an impact driver, and has a wide range of load fluctuations in dependence upon the tool kind. In the case of the electric drill, for example, the load current of the motor may become six or seven times as high as the ordinary one, if the tip tool bites the workpiece. In the case of the impact driver, on the other hand, the load fluctuations are relatively small so that the fluctuations of the load current of the motor are also relatively small. This phenomenon that the load fluctuations are remarkably different for the tool kinds is not found in the mobile electronic device such as the camera or the OA device.

The maker of the battery device for the electric tool of the prior art has determined the rated voltage and the current capacity of the battery pack while considering the differences in those load fluctuations.

However, the user of the battery device using the SCAT can select the value of the current capacity of the device, and may employ the cell assembly unfitted for the magnitude of the fluctuations of the load current of the electric tool. It is, therefore, important to guide the user so that the user can select the cell assembly proper for the kind and characteristics of the electric tool. These technical problems are so specific to the electric tool that they are not found in other electronic devices such as the camera or the OA device.

(3) Countermeasures against Elongation of Charging Time

In the electronic device such as the camera or the personal computer, it is general that the cells are individually charged even in case they are connected in parallel. In case, however, the battery device 10 to be used in the electric tool is to be charged with the charger, it is the current practice that the cell packs are individually charged. Therefore, when the battery pack, in which fifteen NiCd battery cells of nominal voltage of 1.2 V are housed, is charged, the fifteen cells are charged all at once.

In the battery device prepared by the SCAT, on the contrary, the number of battery cells to be housed in the cell assembly is smaller than that of the prior art. This raises a problem that the charging time period is longer than that of the prior art if the charge is performed for each cell assembly.

On the other hand, it is conceivable to charge cell assemblies of a predetermined number simultaneously. The user using the battery device with the SCAT can arbitrarily select the number of cell assemblies used. It is, therefore, inconvenient for the user that what can be selected is to charge only the cell assemblies of a predetermined number. In other words, it is desired for the user that cell assemblies of an arbitrary number can be charged all at once.

A main object of the invention is to provide a battery device using the SCAT and a cordless electric tool using the device, and a battery device solving the aforementioned technical problems and a cordless electric tool using the device.

Specifically, an object of the invention is to solve the aforementioned technical problem (1) and to provide a battery device and a cordless electric tool, which do not damage the battery cells and the cell assembly, even if the load current of the motor is drastically fluctuated by the load fluctuations of the electric tool, and in which the battery cells and the cell assemblies are not damaged even if the cell assemblies of different charges are connected in parallel.

In order to achieve the aforementioned objects, according to the invention, there is provided a cell assembly characterized by comprising: a first cell group having a plurality of cells connected in series; a housing container for housing said first cell group; current detecting means housed in said container for detecting a current to flow through the first cell group; a switching element connected with said first cell group for turning ON/OFF the current to flow through said first cell group; and means for controlling the ON/OFF of said switching element in response to the output signal of said current detecting means.

Another characteristic of the invention is that each cell constituting the cell group uses a lithium cell.

Another characteristic of the invention is that the cell assembly comprises: voltage detecting means for detecting the individual cell voltages of said first cell group; and control means for controlling the ON/OFF of said switching element in response to the output signal of said voltage detecting means.

Another characteristic of the invention is that said housing container has a pair of first discharge terminals formed on its first face and connected with the two terminals of said first cell group, and such a pair of second discharge terminals formed on its second face confronting said first face as are connected with the two terminals of said first cell group.

Another characteristic of the invention is that said housing container has such a pair of charging terminals formed on its third face different from said first face and said second face as are connected with the two terminals of said first cell group.

According to another characteristic of the invention, there is provided a battery device characterized by comprising: a first cell group and a second cell group each having a plurality of cells connected in series; a first container for housing the first cell group and a second container for housing the second cell group; first current detecting means for detecting a current to flow through said first cell group, and second current detecting means for detecting a current to flow through said second cell group; a first switching element connected with said first cell group for turning ON/OFF a current to flow through said first cell group, and a second switching element connected with said second cell group for turning ON/OFF a current to flow through said second cell group; first control means for controlling the ON/OFF of said first switching element with the output signal of said first current detecting means, and second control means for controlling the ON/OFF of said second switching element with the output signal of said second current detecting means; first discharge terminals formed on the first faces of said first and second housing containers and connected with the two terminals of the individual cell groups; second discharge terminals formed on such second faces as confronting the first faces of said first and second housing containers, and connected with the individual cell groups; and engagement members for connecting the first discharge terminals formed on the first face of said first housing container and the second discharge terminals formed on the second face of said second housing container.

According to another characteristic of the invention, there is provided a cordless electric tool characterized by comprising: a motor for generating a rotating power; a tool to be driven by said motor; and a battery device for feeding said motor with a DC voltage, and in that said battery device has one or more cell assemblies each including: a first cell group having a plurality of cells connected in series; a housing container for housing said first cell group; current detecting means housed in said container for detecting the current to flow through the first cell group; a switching element connected with said first cell group for turning ON/OFF the current to flow through said first cell group; and means for controlling the ON/OFF of said switching element in response to the output signal of said current detecting means.

According to another characteristic of the invention, there is provided a cordless electric tool characterized by comprising: a tool body housing a motor for generating a rotating power, and a speed reducing mechanism for reducing the speed of said rotating power; a handle portion connected to said tool body; and a battery device mounted at the end portion of said handle portion on the opposite side of said connected portion, and in that said battery device has one or more cell assemblies each including: a first cell group having a plurality of cells connected in series; a housing container for housing said first cell group; current detecting means housed in said container for detecting the current to flow through the first cell group; a switching element connected with said first cell group for turning ON/OFF the current to flow through said first cell group; and means for controlling the ON/OFF of said switching element in response to the output signal of said current detecting means.

According to another characteristic of the invention, there is provided a cordless electric tool characterized by comprising: a tool body housing a motor for generating a rotating power, and a speed reducing mechanism for reducing the speed of said rotating power; a handle portion connected to said tool body; and a battery device mounted at the end portion of said handle portion on the opposite side of said connected portion, and in that said battery device includes: a first cell group and a second cell group each having a plurality of cells connected in series; a first container for housing the first cell group and a second container for housing the second cell group; first current detecting means for detecting a current to flow through said first cell group, and second current detecting means for detecting a current to flow through said second cell group; a first switching element connected with said first cell group for turning ON/OFF a current to flow through said first cell group, and a second switching element connected with said second cell group for turning ON/OFF a current to flow through said second cell group; first control means for controlling the ON/OFF of said first switching element with the output signal of said first current detecting means, and second control means for controlling the ON/OFF of said second switching element with the output signal of said second current detecting means; first discharge terminals formed on the first faces of said first and second housing containers and connected with the two terminals of the individual cell groups; second discharge terminals formed on such second faces as confronting the first faces of said first and second housing containers, and connected with the individual cell groups; and engagement members for connecting the first discharge terminals formed on the first face of said first housing container and the second discharge terminals formed on the second face of said second housing container.

The remaining characteristics of the invention are more clearly understood from the description to be made in the following.

The following advantages are obtained according to the invention.

(1) Since cell assemblies of an arbitrary number can be mounted on an electric tool, it is possible to provide a cordless electric tool, in which the user can select the current capacity (Ah).

(2) Since the cell assemblies of an arbitrary number can be mounted on the electric tool, the user can adjust the weight of the electric tool.

(3) Since the battery device of the battery device mounted on the electric tool has a switching element for interrupting the current when the current to flow through the cell group is at a predetermined rate or higher, the cell group can be protected against an excessive current due to load fluctuations or the like.

BEST MODE FOR CARRYING OUT OF THE INVENTION

The invention will be described on its embodiments consecutively in the order of (1) Constitution of Battery Device, (2) Constitution of Electric Tool Body, and (3) Constitution of Charger.

(1) Constitution of Battery Device
(1.1) Circuit Constitution

Figure 3:
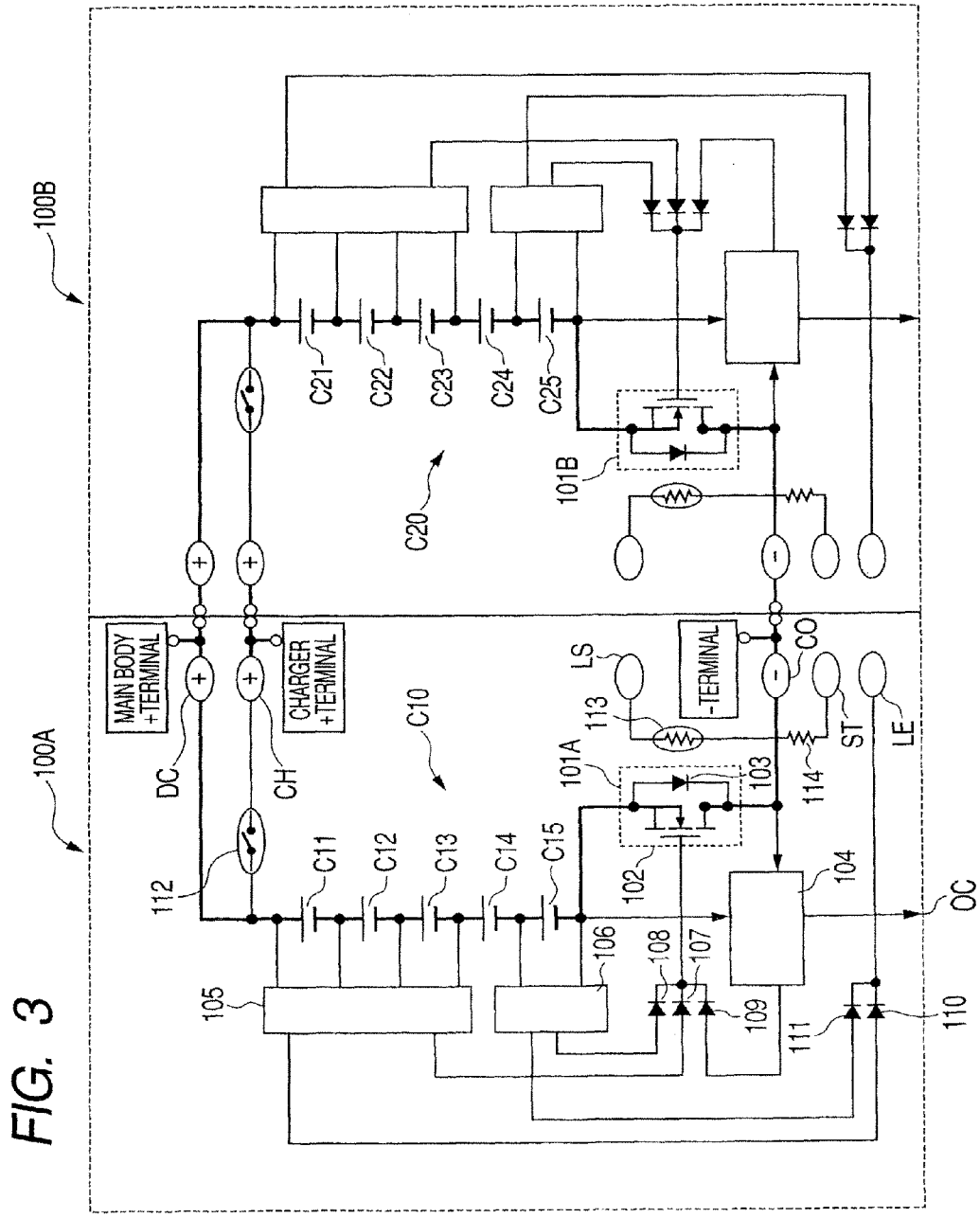
FIG. 3 is a circuit diagram showing one embodiment of a battery device according to the invention.

Here is described a cell assembly constituting the battery device according to the invention. FIG. 3 shows an electric circuit diagram, in which cell assemblies 100A and 100B are connected in parallel. The electric circuit of the cell assembly 100A is identical to that of 100B, and the following description is made only on the electric circuit of one cell assembly 100A.

In this embodiment, the cell assembly 100A includes five lithium cells C11 to C15 connected in series. These cells C11 to C15 will be called a cell group C10.

The cell group C10 has its positive terminal connected with a discharging positive terminal DC and its negative terminal connected with a common negative terminal C0 through a switching element 101. This switching element 101 is composed of an FET 102 and a diode 103 connected between the source and drain of the FET 102.

Figure 1A:
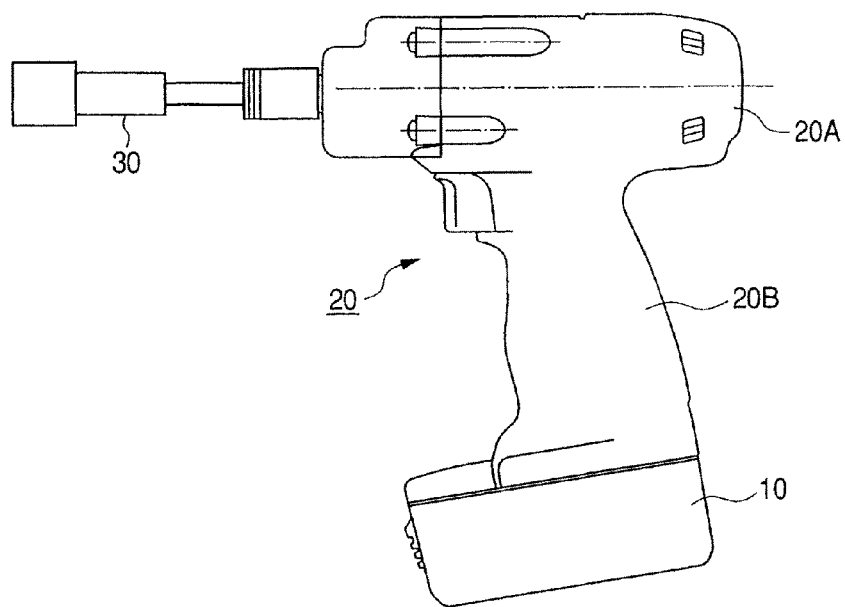
FIGS. 1A-1D are explanatory views for explaining the concept of the invention.
Figures 1B, 1C, 1D:
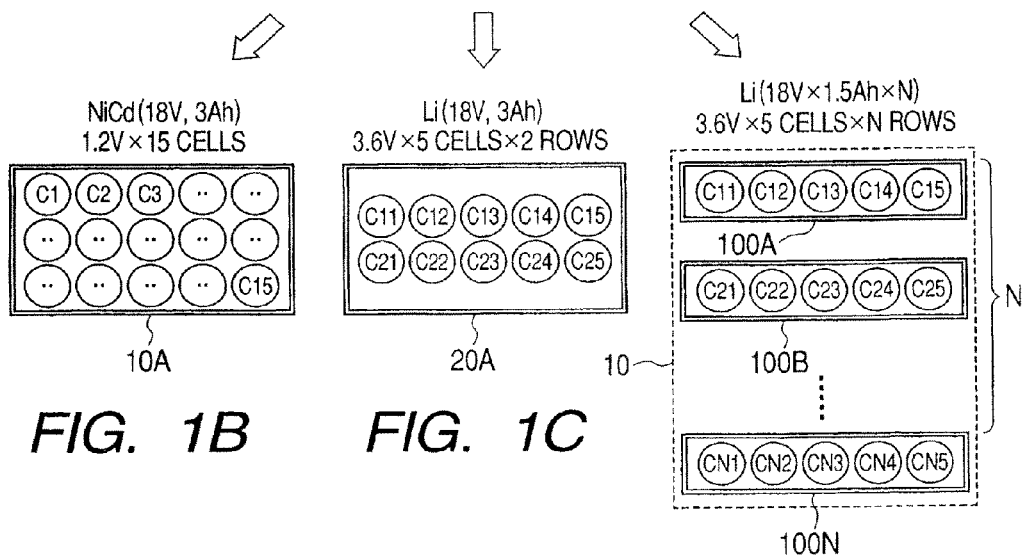
Figure 2A:
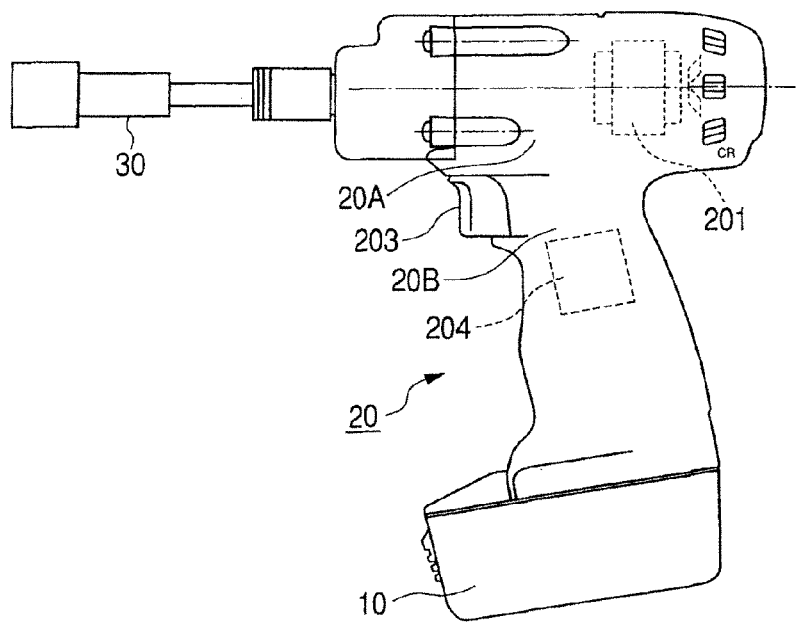
FIG. 2A is a schematic view of a cordless electric tool of the prior art.
Figure 2B:
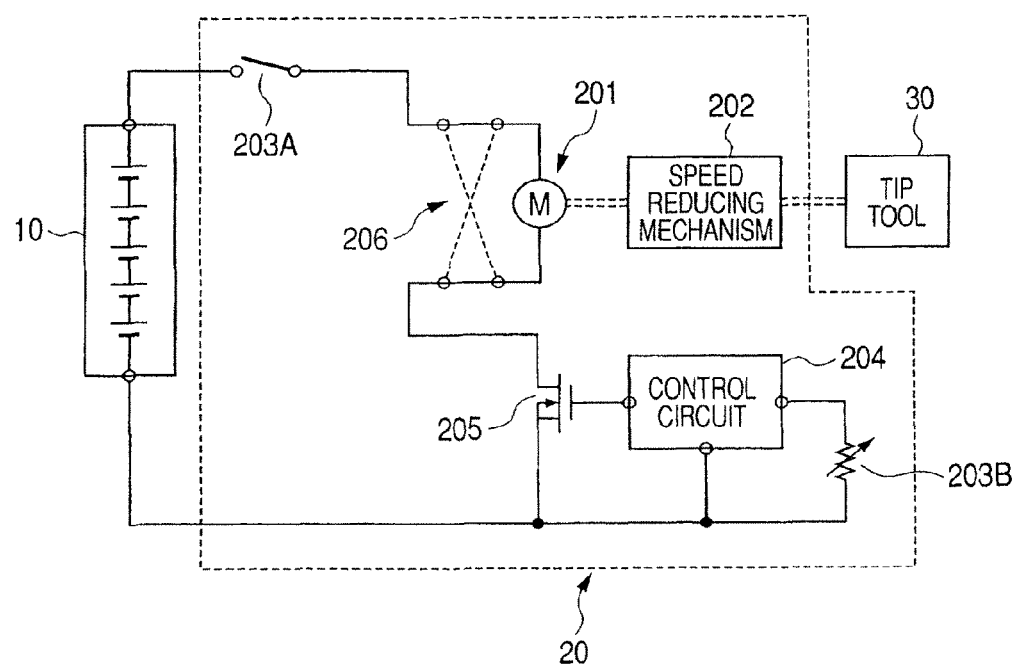
FIG. 2B is an explanatory diagram of a motor current of the cordless electric tool of the prior art.

Numeral 104 designates an overcurrent detecting circuit, which is connected between the source and drain of the switching FET 102 so that it outputs a signal proportional to the magnitude of the current to flow between the source and the drain. The output signal of the overcurrent detecting circuit 104 is applied through a diode 109 to the gate of the switching FET 102 and is introduced into an overcurrent signal detection terminal OC. The signal at this terminal OC is applied, if necessary, to a control circuit 204 (FIG. 2B) of the cordless electric tool and a microcomputer 530 (FIG. 6B) of a charger 50.

Figure 6A:
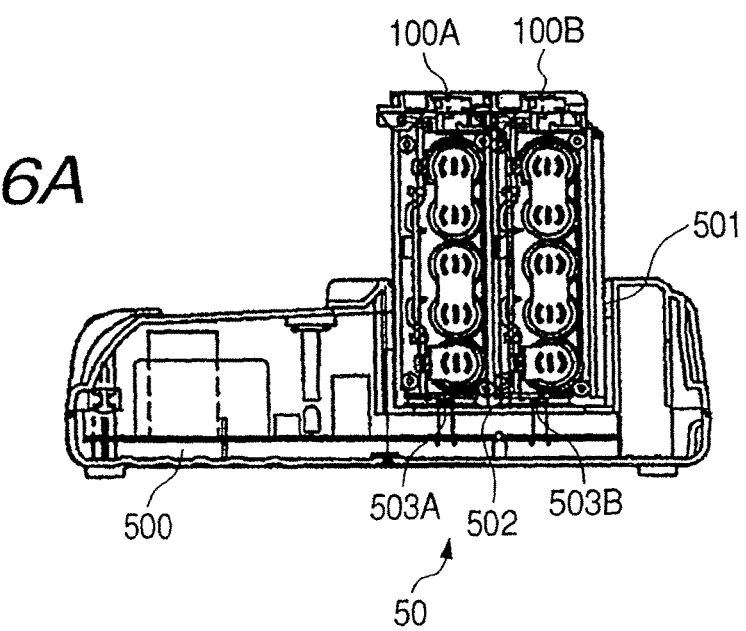
FIG. 6A is a sectional view of a charging device for charging the battery device according to the invention.
Figure 6B:
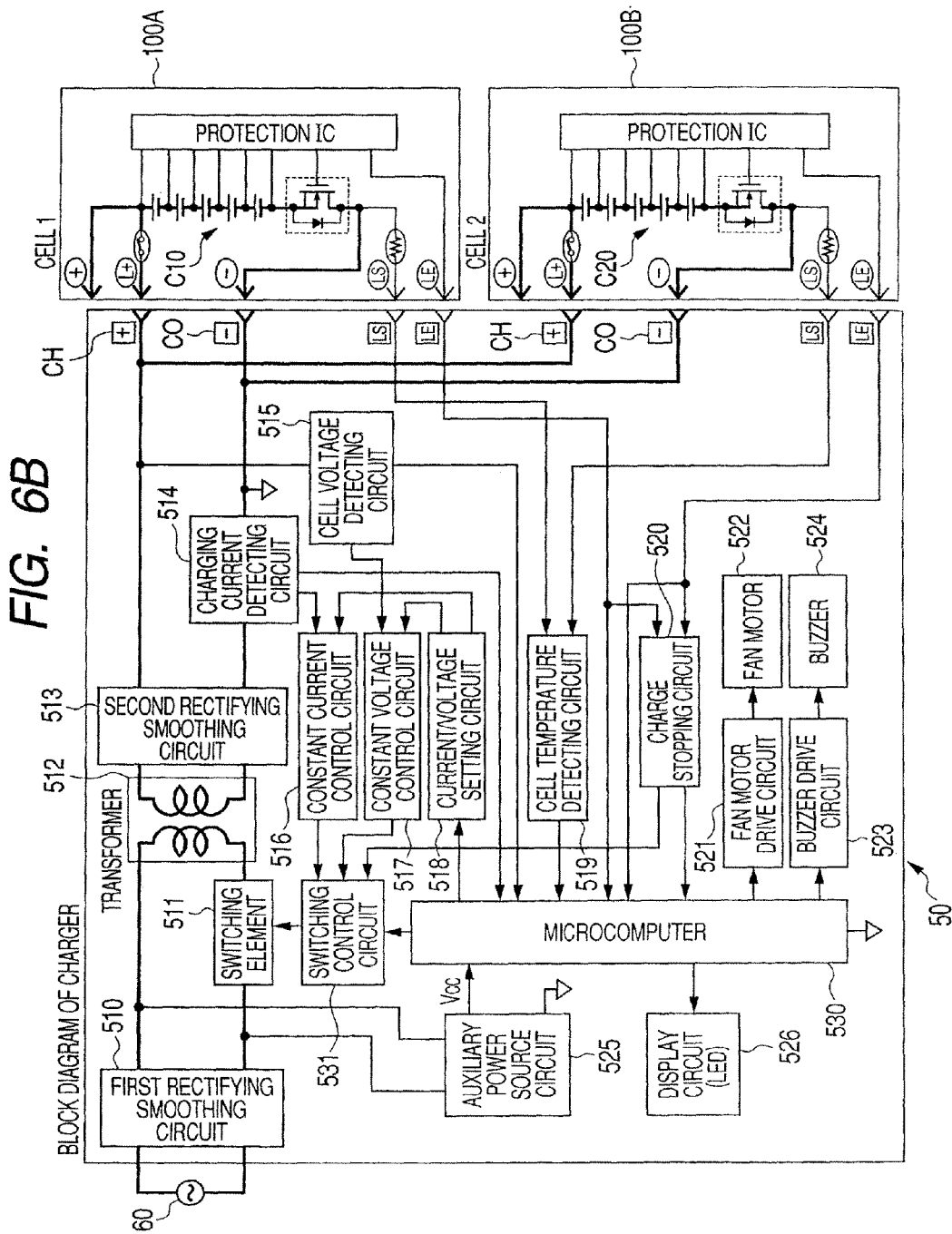
FIG. 6B is an electric circuit diagram of the charging device for charging the battery device according to the invention.

On the other hand, the lithium cells C11 to C15 are connected with protection circuits 105 and 106 for protecting the cells. These protection circuits are exemplified by the IC (MM1414 or MM3090) of Mitsumi Denkisha. This protection IC is constituted to include four input terminals at the maximum and to generate an output signal when a predetermined or higher voltage enters any of the input terminals. The output signals of the protection circuits 105 and 106 are introduced through diodes 110 and 111, respectively, into an overvoltage detection terminal LE. The signal of this terminal LE is applied to the microcomputer 530 (FIG. 6B) of the later-described charger 50. On the other hand, the output signals of the protection circuits 105 and 106 are applied through diodes 107 and 108, respectively, to the gate of the switching FET 102. A thermistor 113 for detecting the temperature of the cell group C10 is connected with the source or drain of the switching element 101. This temperature detection signal is guided to a signal terminal LS and is applied to the microcomputer 530 of the later-described charger 50 (FIG. 6B).

On the other hand, a resistor 114 indicates the cell number of the cell group C10 and has a resistance made different according to the number of cells. An electric signal according to the resistance of the resistor 114 is guided by a cell number signal detection terminal ST and is applied to the microcomputer 530 (FIG. 6B) of the later-described charger 50. Between the positive terminal of the cell group C10 and a charging terminal CH, there is connected a thermostat 112, which acts to stop the charge when the temperature of the cell assembly 100A exceeds a predetermined temperature.

When the cell assembly 100A and the cell assembly 100B thus constituted are connected in parallel, as shown in FIG. 3, the voltage difference between the cell group C10 and the cell group C20 may become large, as in case one cell group C10 is fully charged whereas the other cell group C20 is 0. In this case, the overcurrent may flow into the closed circuit including the cell groups C10 and C20 and switching elements 101A and 101B. In case, moreover, the voltage between the terminals DC and CO is fed to a motor 201 shown in FIG. 2B, the overcurrent may flow into the cell assemblies 100A and 100B if the load of the motor 201 is high.

According to the battery device of the invention, however, when the overcurrent flows into the cell group C10, the voltage between the source and drain of the switching element 101 increases. When this voltage exceeds a predetermine value, the overcurrent detecting circuit 104 generates the output signal. This output signal is applied through the diode 109 to the gate of the switching FET 102 to interrupt the FET 102. As a result, the overcurrent flows to the cell group C10 thereby to prevent the same from being damaged.

When any of the cells of the cell group C10 is charged to a voltage exceeding a predetermined value, the protection circuits 105 and 106 also generate output signals to interrupt the FET 102. It is, therefore, possible to prevent the overcharge of the cells C11 to C15.

(1.2) Structure of Cell Assembly

Figure 4A:
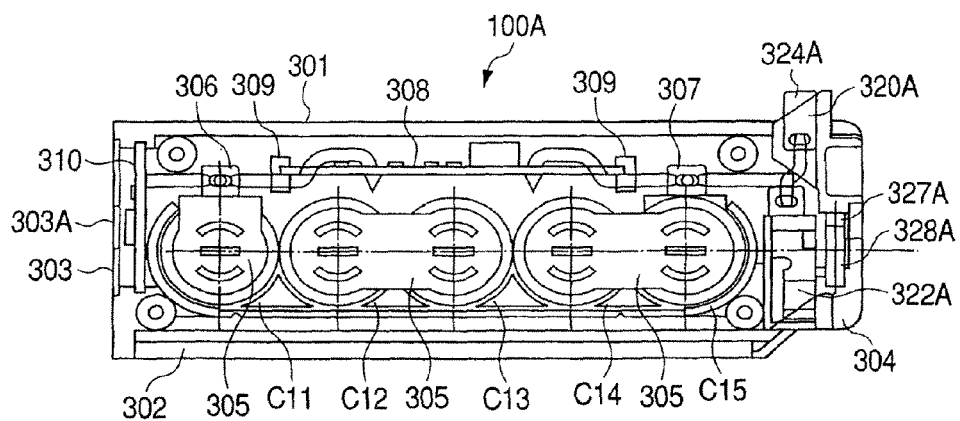
FIG. 4A is a sectional view showing one embodiment of a cell assembly constituting the battery device according to the invention.

Next, the structure of the cell assembly of the battery device of the invention is described with reference to FIG. 4A to FIG. 4E. As shown in FIG. 4A, the cell housing container is constituted to include an upper plate 301, a lower plate 302 and two side plates 303 and 304. The five lithium cells C11 to C15 are arranged in that container. The individual cells C11 to C15 are connected in series by terminal plates 30, and the cell C11 has its anode connected with a terminal 306 whereas the cell C15 has its cathode connected with a terminal 307. A circuit board 308 is arranged in the space between the upper plate 301 and the cell groups C10 to C15 and is supported by support members 309. The circuit elements 101 to 111, as shown in FIG. 3, are mounted on the upper face of the circuit board 308.

Figure 4B:
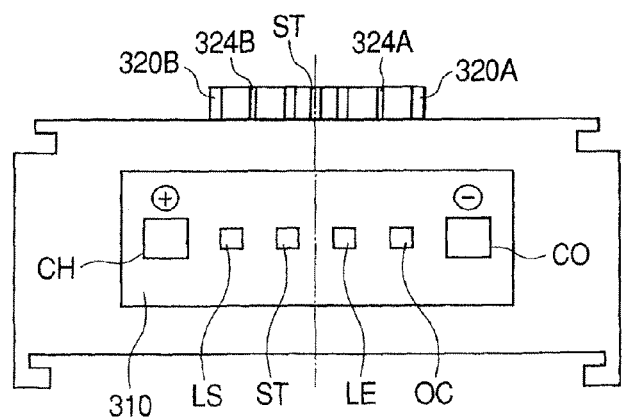
FIG. 4B is a side elevation of the cell assemblies constituting the battery device according to the invention.

Adjacent to the side plate 303, on the other hand, there is arranged a charging terminal board 310, which is equipped thereon with positive and negative charging terminals CH and CO and the signal detection terminals LS, ST, LE and OC, as shown in FIG. 4B. In a portion of the side plate 303 of FIG. 4A, there is formed an opening 303A, through which the voltage can be applied to the terminals CH and CO.

The right side plate 304 of FIG. 4A is equipped with a first engagement member 320A, which is made vertically movable for bringing the cell assembly 100A into engagement with the other cell assembly 100B (although not shown). The first engagement member 320A is equipped with a downward extending portion 327A, which is inserted into a hole portion 328A. In this hole portion 32A, there is disposed a spring (although not-shown) for pushing the first engagement member 320A upward into engagement with a second engagement member 322A of another cell assembly to be described hereinafter.

Figure 4C:
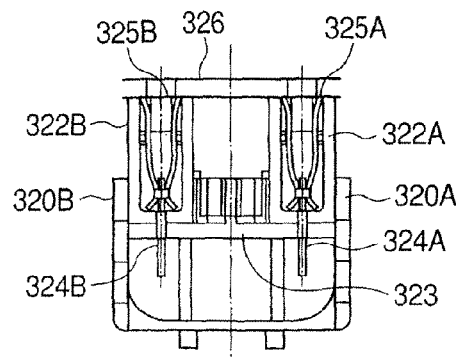
FIG. 4C is a sectional view of a connecting portion of the cell assemblies constituting the battery device according to the invention.

In FIG. 4A, one first engagement member 320A is shown, but another is disposed on the deep side of the drawing. That is, the two first engagement members 320A and 320B are provided, as shown in FIG. 4B. These first engagement members 320A and 320B are attached to a support member 323, as shown in FIG. 4C, which is provided with two upright metal plates 324A and 324B.

In the other cell assembly 100B, the second engagement members 322A and 322B are attached to a support member 326, and metal plates 325A and 325B are disposed in the engagement members 322A and 322B. When the second engagement members 322A and 322B are brought into engagement with the first engagement members 320A and 320B, as shown in FIG. 4C, the other metal plates 324A and 324B are inserted into the metal plates 325A and 325B so that the two cell assemblies 100A and 100B are connected to each other.

As shown in FIG. 4A, the positive terminal 306 of the cell C11 is connected through the wiring line on the circuit board 308 with the metal plates 324A and 325A, and the negative terminal 307 of the cell C15 is connected with the metal plates 324B and 32513 (FIG. 40). Likewise, the positive terminal (although not shown) of the cell C21 of the cell assembly 100B is connected with the metal plates 325A and 324A, and the negative terminal (although not shown) of a cell C25 is connected with the metal plates 325B and 324B. As a result, when the metal plate 324A of the assembly 100A and the metal plate 325A of the assembly 100B are connected, and when the metal plate 324B of the assembly 100A and the metal plate 325B of the assembly 100B are connected, the two cell assemblies 100A and 10013 are connected in parallel.

The first engagement members 320A and 320B, as urged upward by the springs, are equipped with the metal plates 324A and 324B to act as discharge terminals so that the metal plates 324A and 3248 are always pushed toward the metal plates 325A and 325B to act as the discharge terminals of another cell assembly. Even if the cordless electric tool vibrates, it is possible to hold the contacts stable between the metal plates 324A and 325A and the metal plates 324B and 325B.

Figure 4D:
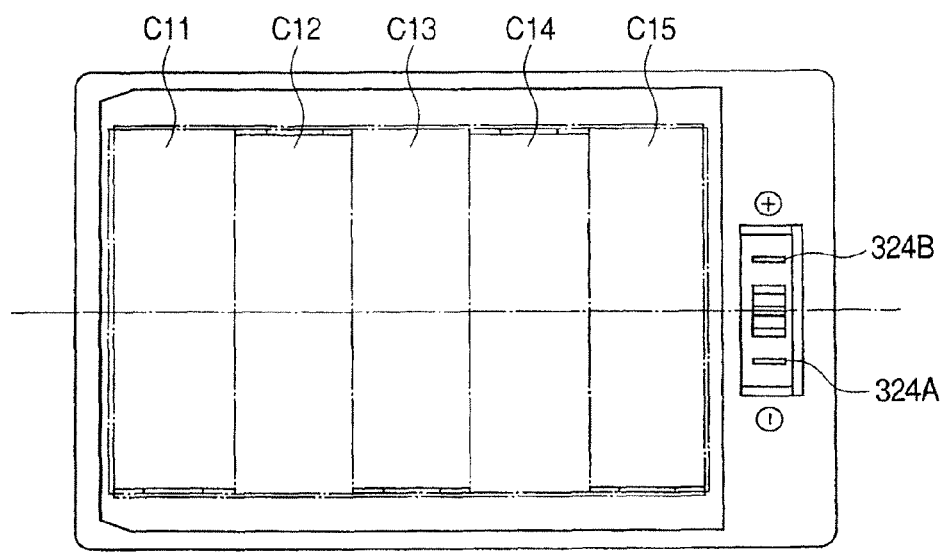
FIG. 4D is an upper face view of the cell assemblies constituting the battery device according to the invention.

FIG. 4D shows the upper face view of the cell assembly 100A. On the upper face of the cell assembly container, there are arranged the first engagement members, which are equipped with the discharge positive terminal 324A connected with the positive terminal of the cell C11 and the discharge negative terminal 324B connected with the negative terminal of the cell C15. On the lower face opposed to that upper face, there are likewise arranged the second engagement members, which are equipped with the discharge positive terminal 325A and the discharge negative terminal 325B.

On the other hand, the charging terminals of the cell group C10 is disposed on the side face other than the upper and lower faces of the container, so that the cell assemblies 100A and 100B can be charged while being stacked and connected in parallel.

Figure 4E:
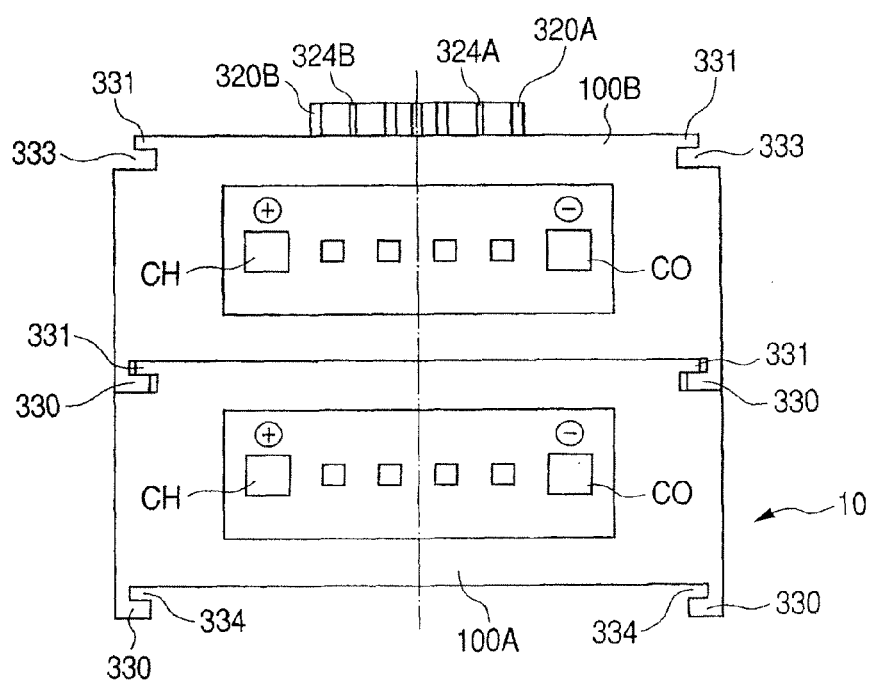
FIG. 4E is a schematic view of the battery device, in which the cell assemblies according to the invention are stacked.

FIG. 4E shows a battery device 10, in which the two cell assemblies 100A and 100B are stacked. In the upper face end portions of each of the battery devices 100A and 100B, there are provided slide rails, which are composed of protrusions 331 and recesses 333. In the lower face end portions, there are provided slide rails, which are composed of protrusions 330 and recesses 334. The battery device 10, as composed of two cell assemblies 100A and 100B, is constituted by bringing the lower slide rails of the cell assembly 100B into engagement with the upper rails of the cell assembly 100A.

(2) Constitution of Electric Tool Body

Next, the connection of the cordless electric tool and the battery device 10 according to the invention is described with reference to FIG. 5A.

As described hereinbefore, the cordless electric tool according to the invention allows the user to select its current capacity (Ah), but may damage the battery device unless the tool employs the battery device of a predetermined current capacity or higher. In the case of the driver drill, for example, an excessive current may flow through the motor 201, when a tip tool 30 of FIG. 2B bits a workpiece, thereby to damage the battery seriously if the current capacity (Ah) of the battery device 10 is small. Therefore, the tool body of the invention is equipped with a control circuit for leaving the tool inactive in case a battery having a smaller current capacity than that necessary for the tool.

Figure 5A:
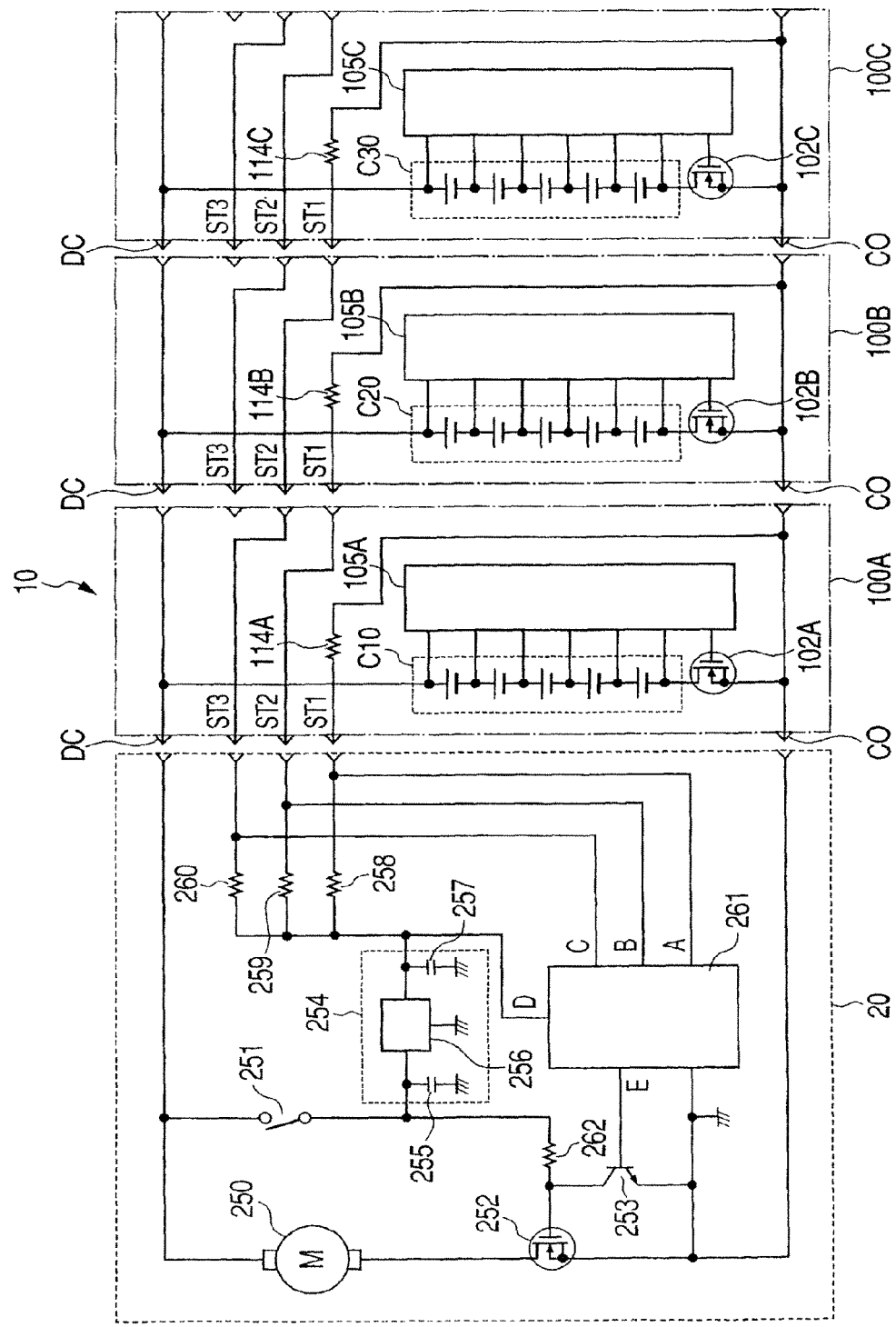
FIG. 5A is an electric circuit diagram at the time when the cordless electric tool according to the invention is connected with the battery device.

The embodiment, as shown in FIG. 5A, shows an example, in which the battery device 10 including the three cell assemblies 100A, 100B and 100C is mounted on an electric tool body 20. A motor 250 and a switching FET 22 are connected in series between the discharging positive terminal DC and the negative terminal CO of the battery device 10. Moreover, the positive terminal DC is connected through a trigger switch 251 and a resistor 262 with the gate of the switching FET 252 and the collector of a transistor 253. The source of the FET 252 and the emitter of the transistor 253 are commonly connected and are earthed to the ground. Moreover, the base of the transistor 253 is connected with the output terminal of a control circuit 261.

Numeral 254 designates a constant-voltage power source, which is constituted to include a regulator 256 and capacitors 255 and 257. This constant-voltage power source 254 has its output voltage V0 fed to the control circuit 261.

With the cell assemblies 100A, 100B and 100C, on the other hand, there are respectively connected resistors 114A, 114B and 114C for discriminating cell numbers, as shown in FIG. 3. These resistors 114 have resistances made different according to the number of cells constituting the cell assembly 100. If these resistances are detected, therefore, it is possible to discriminate the number of cells composing the cell assembly 100. In this embodiment, it is assumed for the cell number of five that the resistors 114A, 114B and 114C have a value R1.

The cell assembly 100C has its detection terminal ST1 connected with the detection terminal ST2 of the cell assembly 100B, and the cell assembly 100B has its detection terminals ST1 and ST2 connected with the output terminals ST2 and ST3 of the cell assembly 100A, respectively.

As a result, the detection terminals ST1, ST2 and ST3 of the cell assembly 100A are connected with the cell number discrimination resistors 114A, 114B and 114C, respectively. The detection terminals ST1, ST2 and ST3 of the cell assembly 100A are connected through pull-up resistors 258, 259 and 260, respectively, with the power source voltage terminal D of the control circuit 261 and with input terminals A, B and C. If the pull-up resistors 258, 259 and 260 individually have a value R2, if the constant-voltage power source 254 has an output voltage V0 and if the cell number discrimination resistor 114 has a resistance R1, a voltage of R1/(R1+R2)V0 is applied to the individual terminals A, B and C. In case the cell assembly is not connected, moreover, the voltage V0 is applied to the terminals A, B and C.

Now, if the R1 is 100Ω, if the R2 is 10 KΩ and if the V0 is 5 V, a voltage near 0 V is applied to the input terminals (A, B, C), in case the cell assembly 100 is connected, and a voltage near 5 V is applied to the input terminals (A, B, C), in case the cell assembly 100 is not connected. If, therefore, the voltages to be applied to the terminals A, B and C are binarized with an intermediate threshold value between 5 V and 0 V, the number of cell assemblies connected can be obtained as a binary signal. If the high level is 1 (high) and if the low level is 0 (low), for example, the control circuit 261 can recognize that one cell assembly is connected when the terminals (A, B, C) are (0, 1, 1), that two cell assemblies are connected when the terminals (A, B, C) are (0, 0, 1), and that three cell assemblies are connected when the terminals (A, B, C) are (0, 0, 0). The control circuit 261 is constituted in advance to generate an output signal at an output terminal E in accordance with the values (A, B, C). For example, it is preset that the output terminal E is 0 (low) when (A, B, C) are (0, 0, 0) and (0, 0, 1), and that the output terminal E is 1 (high) when (A, B, C) are (0, 1, 1) and (1, 1, 1).

The actions of the circuit shown in FIG. 5A are described in the following. When the user turns ON the trigger switch 251, the positive voltage of the battery device 10 is applied through the switch 251 and the resistor 262 to the gate of the switching FET 252 so that the FET 252 is turned ON.

On the other hand, the control circuit 261 detects the number of connected cell assemblies 100 with the magnitudes of the signals to enter the input terminals A, B and C. In case the cell assemblies 100 of the necessary number are not connected with the tool 20, the signal at 1 is outputted from the output terminal E. With this signal, the transistor 253 is turned ON. As a result, the gate and source of the switching FET 252 are shorted so that the FET 252 is turned OFF. In other words, the tool 20 is controlled to become inactive, in case the cell assemblies of a number less than the preset value are connected with the control circuit 261.

Figure 5B:
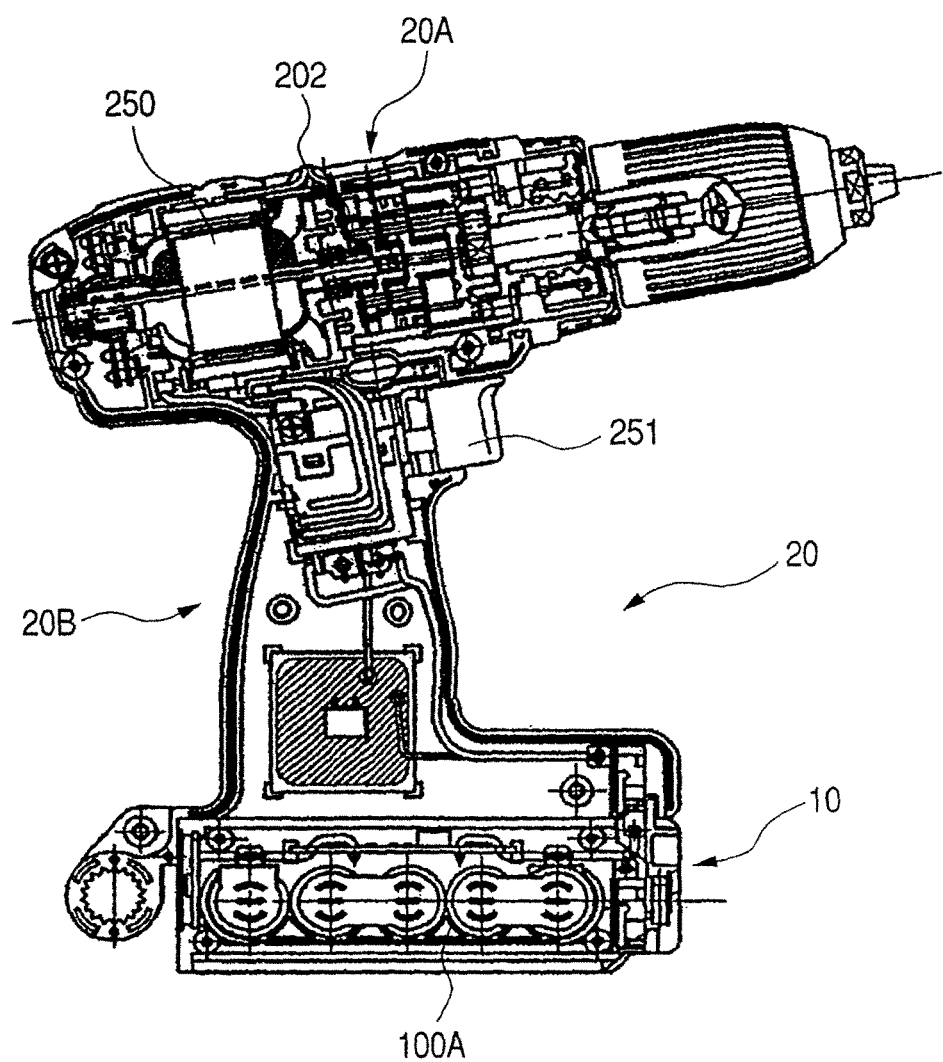
FIG. 5B is a sectional view of a cordless electric tool according to the invention at the time when one cell assembly is mounted.
Figure 5C:
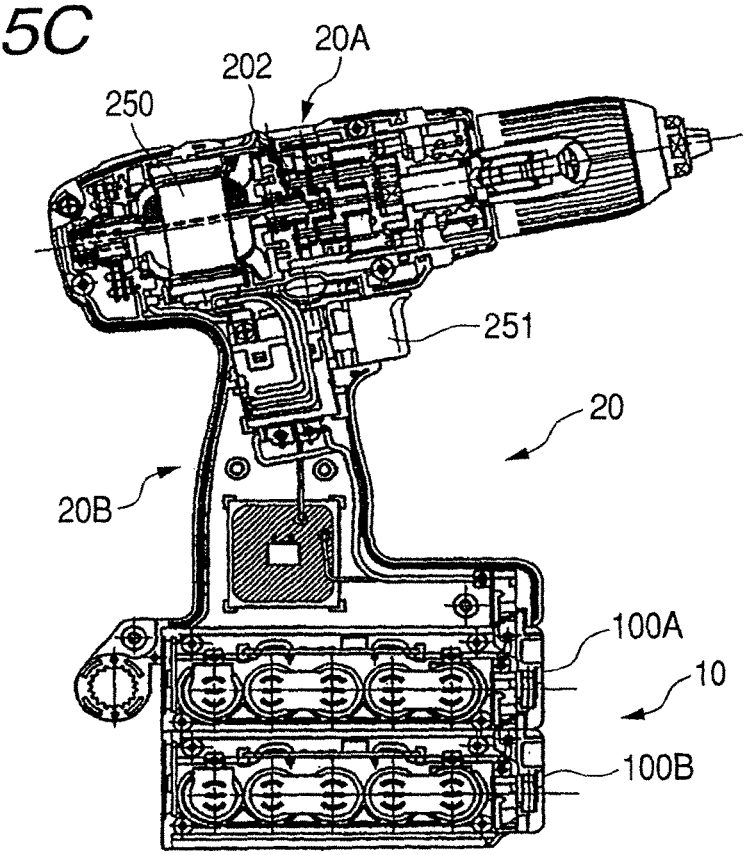
FIG. 5C is a sectional view of a cordless electric tool according to the invention at the time when two cell assemblies are mounted.

FIG. 5B is a sectional view of the electric tool 20 according to the invention. The motor 250, a speed reducing mechanism 202 and so on are housed in a body trunk portion 20A, and the battery device 10 is mounted on one end of a handle portion 20B. On the other hand, FIG. 5C shows an example, in which the two cell assemblies 100A and 100B are mounted as the battery device 10.

(3) Constitution of Charger

Next, the constitution of the charger according to the invention is described with reference to FIG. 6A and FIG. 6B. The charger 50 is constituted to include a body 500 and a cell housing unit 501. The cell housing unit 501 is so constituted as to house a plurality of cell assemblies 100. This embodiment presents an example for housing the two cell assemblies 100A and 100B, and is so designed as to house two or more arbitrary cell assemblies.

On the bottom face 502 of the cell housing unit 501, there are mounted terminal plates 503A and 503B. Each of these terminal plates 503A and 503B is equipped with terminals to be connected with the charging positive terminal CH, the charging negative terminal CO, and the signal terminals LS, ST, LE and OC, as shown in FIG. 4B.

FIG. 6B shows an electric circuit of the charger 50. The voltage of a commercial AC power source 60 is converted into a DC voltage by a rectifying smoothing circuit 510, and is then applied through a switching element 511 to a transformer 512. By controlling the ON-time of the switching element 511, the average value of the voltage to appear at the secondary side winding of the transformer 512 can be controlled in its magnitude.

The voltage of the secondary side winding of the transformer 512 is converted again into a DC voltage by a rectifying smoothing circuit 513, and is then applied to the charging positive terminal CH and the negative terminal CO of the cell assemblies 100A and 100B thereby to charge the cell groups C10 and C20 in those cell assemblies 100A and 100B.

The magnitude of the charging current, which corresponds to the sum of the charging current of the cell assembly 100A and the charging current of the cell assembly 100B, is detected by a charging current detecting circuit 514 connected with the secondary side of the transformer 512, and is applied to the microcomputer 530.

On the other hand, the terminal voltages of the cell groups C10 and C20 of cell assemblies 100A and 100B are detected by a cell voltage detecting circuit 515, and are applied to the microcomputer 530.

Moreover, the signals indicating the temperatures of the cell groups C10 and C20 of the cell assemblies 100A and 100B are applied from the terminal LS to the cell temperature detecting circuit, the output of which is applied to the microcomputer 530. An overvoltage detection signal is applied, when it appears at the signal terminal LE, to the microcomputer 530 and to a charge stopping circuit 520. This charge stopping circuit 520 sends, when the overvoltage detection signal comes, the output signal to a switching control circuit 531 thereby to turn OFF the switching element 511.

A constant power source voltage Vcc, as generated by an auxiliary power source circuit 525, is applied to the microcomputer 530. On the basis of the various detection signals, moreover, signals for instructing the set voltage and the set current are sent to a current/voltage setting circuit 518. A constant-current control circuit 516 compares the set voltage of the setting circuit 518 and the charging current from the charging current detecting circuit 514, and controls the ON/OFF of the switching element 511 so that the charging current may be equal to the set current. Likewise, a constant-voltage control circuit 517 compares the set voltage of the setting circuit 518 and the cell voltage from the cell voltage detecting circuit 515, and controls the ON/OFF of the switching element 511 so that the cell voltage may be equal to the set voltage.

Moreover, the microcomputer 530 sends a signal to a display circuit 526 thereby to display the charging action, and sends a signal to a fan motor driving circuit 521 thereby to drive a fan motor 522. The microcomputer 530 controls a signal to a buzzer driving circuit 523 thereby to sound a necessary buzzer 524.

Figure 6C:
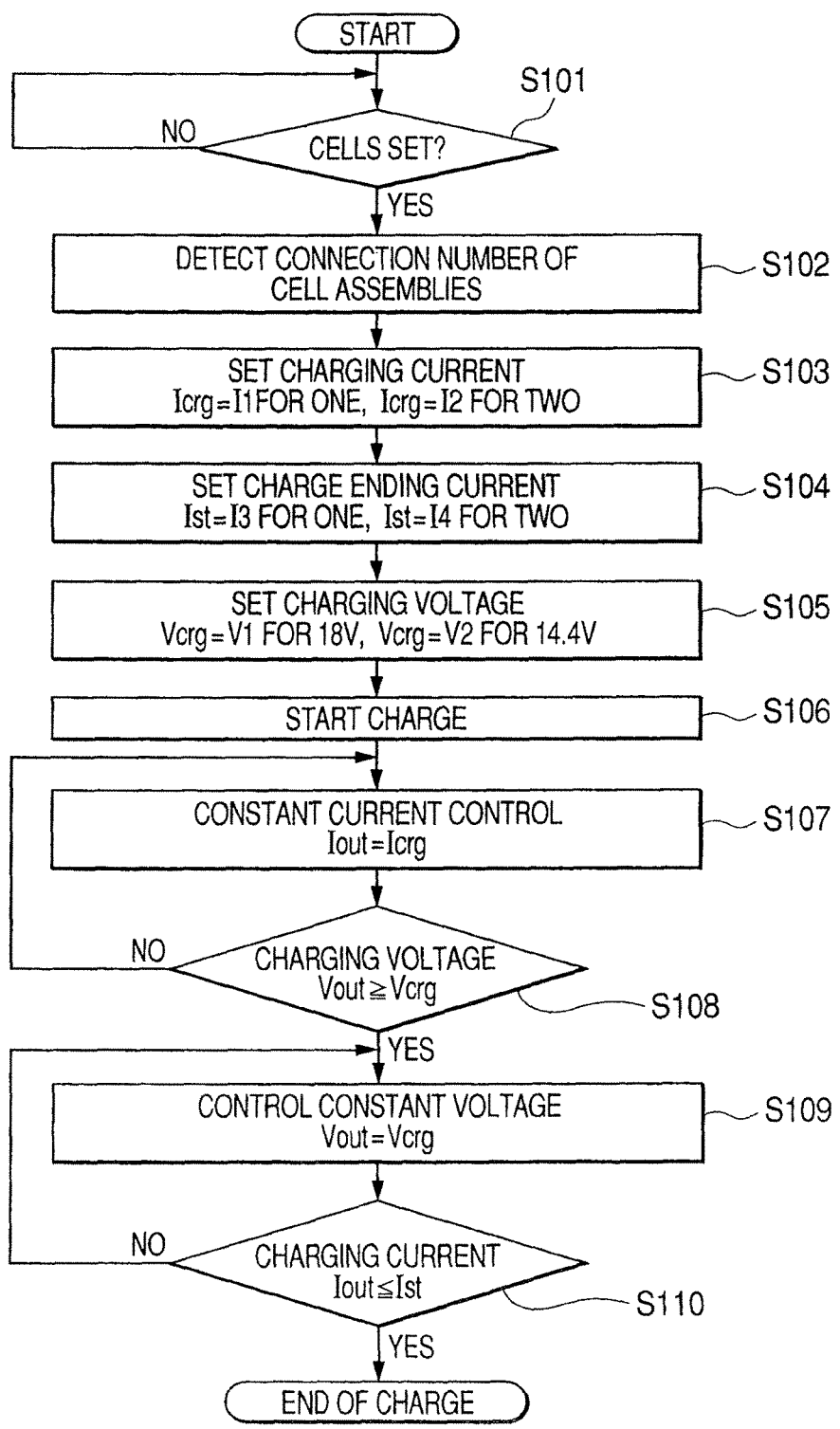
FIG. 6C is a flow chart showing the control flow of the charging device for charging the battery device according to the invention.

Next, a control flow of the aforementioned charger is described with reference to FIG. 6C.

At Step S101, it is decided whether or not the cell assemblies 100A and 100B have been set in the charger 50. If set, the number of cell assemblies connected with the charger 50 is detected at Step S102. There are many detecting methods, by which it is decided that the number of cell assemblies is two, if signals enter a detection circuit 519 from the two LS terminals, and that the number is one, if the signal goes from one LS terminal.

At Step S103, a charging current Icrg is set according to the number of cell assemblies 100 connected. The charging current Icrg is set to I1, if the number of cell assemblies 100 connected is one, and the charging current Icrg is set to I2, if two. Usually, the value I2 is set to two times as high as the value I1. At Step S104, moreover, the charge ending current at the end of the charge is set. In case a nickel-cadmium cell or a nickel-hydrogen cell is to be charged, the cell voltage or the cell temperature is generally detected to decide the timing, at which the charge is ended. In case a lithium cell is to be charged, the charging current is detected to decide the charge ending timing.

At Step S105, the charging voltage is set. For example, the charging voltage is set to V1, if the voltage of the cell assembly 100 is 18 V, and to V2, if the 14.4 V.

Next, at Step S106, the charge is started, and a constant-current control is made (at Step S107). In short, the control is made such that the current Iout to flow through the cell assembly 100 may be a constant current value Icrg. At Step S108, it is decided whether or not a charging voltage Vout of the cell assembly 100 reaches a preset charging voltage Vcrg. In case the decision result is YES, the control is switched to the constant-voltage control at Step S109. Specifically, the constant-current control is made at first, in case the lithium cell is charged, and the constant-voltage control is made after charged to a predetermined voltage. After switched to the constant-voltage control, the charging current Iout of the cell assembly 100 gradually drops. It is decided (at Step S110) whether or not a preset charge ending current Ist has been reached. If the decision result is YES, the charge is ended.

In the charging device of the invention, as has been described hereinbefore, the different charging currents and charge ending currents are set according to the number of cell assemblies to be connected.

The embodiments of the invention thus far described can be easily modified in various manners without any change in the basic concept of the invention, and these modifications belong to the invention. For example, the overcurrent detecting circuit 104 in FIG. 3 is constituted to detect the source-drain voltage of the switching FET 102, but may also be constituted such that a fixed resistor is connected in series with the cell group C10 and that the voltage between the two ends of the fixed resistor is detected. Moreover, the switching FET 102 has to be disposed for each cell group, but may be disposed outside of the cell container.

The invention claimed is:

1. An electric device configured to be connectable to a first battery pack including plural battery cells, a positive terminal and a negative terminal, and connectable to a second battery pack including plural battery cells, a positive terminal and a negative terminal, the electric device comprising:
    a first positive terminal configured to be connected to the positive terminal of the first battery pack;
    a first negative terminal configured to be connected to the negative terminal of the first battery pack;
    a second positive terminal configured to be connected to the positive terminal of the second battery pack;
    a second negative terminal configured to be connected to the negative terminal of the second battery pack;
    a first control signal terminal configured to receive one of a signal indicative of the number of the plural battery cells of the first battery pack and a signal supplied from a first protection circuit for protecting the plural battery cells of the first battery pack;
    a second control signal terminal configured to receive one of a signal indicative of the number of the plural battery cells of the second battery pack and a signal supplied from a second protection circuit for protecting the plural battery cells of the second battery pack;
    a switching element connected to a current path between the first and second positive terminals and the first and second negative terminals; and
    a controller configured to control the switching element to be turned off based on the signal input to one of the first and second control signal terminal.

2. The electric device according to claim 1, wherein the plural battery cells of the first and second battery packs are lithium cells.

3. The electric device according to claim 1, wherein the electric device includes one of a cordless electric tool and a battery charger.

4. The system according to claim 1, wherein when the first battery pack and the second battery pack are housed in the cell housing unit, the first battery pack is connected to the second battery pack in parallel.

5. A system comprising:
a first battery pack including plural battery cells, a positive terminal and a negative terminal;
a second battery pack including plural battery cells, a positive terminal and a negative terminal; and
an electric device configured to be connectable to the first and second battery packs, the electric device including:
a first positive terminal configured to be connected to the positive terminal of the first battery pack;
a first negative terminal configured to be connected to the negative terminal of the first battery pack;
a second positive terminal configured to be connected to the positive terminal of the second battery pack;
a second negative terminal configured to be connected to the negative terminal of the second battery pack;
a first control signal terminal configured to receive one of a signal indicative of the number of the plural battery cells of the first battery pack and a signal supplied from a first protection circuit for protecting the plural battery cells of the first battery pack;
a second control signal terminal configured to receive one of a signal indicative of the number of the plural battery cells of the second battery pack and a signal supplied from a second protection circuit for protecting the plural battery cells of the second battery pack;
a switching element connected to a current path between the first and second positive terminals and the first and second negative terminals; and
a controller configured to control the switching element to be turned off based on the signal input to one of the first and second control signal terminal.

6. The system according to claim 5, wherein the plural battery cells of the first and second battery packs are lithium cells.

7. The system according to claim 5, wherein the electric device includes one of a cordless electric tool and a battery charger.

8. The system according to claim 5, wherein when the first battery pack and the second battery pack are housed in the cell housing unit, the first battery pack is connected to the second battery pack in parallel.

9. A system comprising:
a first battery pack including at lease one battery cell, and a first protection circuit configured to protect the battery cell;
a second battery pack including at least one battery cell, and a second protection circuit configured to protect the battery cell; and
an electric device configured to be connectable to the first and second battery packs, the electric device including:
a cell housing unit configured to house the first battery pack and the second battery pack;
a first terminal configured to be electrically connected to the first battery pack, the first terminal being provided at the cell housing unit;
a second terminal configured to be electrically connected to the first protection circuit, the second terminal being provided at the cell housing unit;
a third terminal configured to be electrically connected to the second battery pack, the third terminal being provided at the cell housing unit;
a fourth terminal configured to be electrically connected to the second protection circuit, the fourth terminal being provided at the cell housing unit;
a switching element configured to control a current flowing through the first terminal and the third terminal; and
a controller configured to control the switching element based on signals received by one of the second terminal and the fourth terminal.

10. The system according to claim 9, wherein
the cell housing unit includes a first housing part configured to house the first battery pack, and a second housing part configured to house the second battery pack,
the first terminal and the second terminal are provided at the first housing part, and
the third terminal and the fourth terminal are provided at the second housing part.

11. The system according to claim 9, wherein when the first battery pack and the second battery pack are housed in the cell housing unit, the first battery pack is connected to the second battery pack in parallel.

12. The electric device according to claim 9, wherein the battery cell of the first and second battery packs is a lithium cell.

13. The electric device according to claim 9, wherein the electric device includes one of a cordless electric tool and a battery charger.

* * * * *

UNITED STATES PATENT AND TRADEMARK OFFICE
CERTIFICATE OF CORRECTION

PATENT NO.        : 8,579,042 B2  
APPLICATION NO.   : 13/770727  
DATED             : November 12, 2013  
INVENTOR(S)       : Hanawa et al.

Page 1 of 1

It is certified that error appears in the above-identified patent and that said Letters Patent is hereby corrected as shown below:

Title Page

In item "(63) Related U.S. Application Data", Data should read -- Continuation of application No. 12/280,948 filed on August 27, 2008 now Pat. No. 8,381,829, which is a National Stage of PCT/JP2007/054360 filed February 28, 2007 -- rather than -- Continuation of application No. 12/280,948, filed as application No. PCT/JP2007/054360 on Feb. 28, 2007, now Pat. No. 8,381,829. --

Signed and Sealed this  
First Day of July, 2014

Michelle K. Lee  
*Deputy Director of the United States Patent and Trademark Office*